United States Patent [19]

Thompson et al.

[11] Patent Number: 5,408,025
[45] Date of Patent: Apr. 18, 1995

[54] SYNTHESIS OF LOW SILANOL CONTENT, TRIORGANO-STOPPED SILICONE FLUIDS

[75] Inventors: Dennis P. Thompson, Clifton Park, N.Y.; Patricia P. Anderson, Williamstown, Mass.; Donald Slick, Clifton Park, N.Y.

[73] Assignee: General Electric Company, Waterford, N.Y.

[21] Appl. No.: 91,898

[22] Filed: Jul. 15, 1993

[51] Int. Cl.⁶ .............................................. C08G 77/08
[52] U.S. Cl. ...................................... 528/12; 528/14; 528/22; 528/23; 528/37; 556/462; 556/467; 556/469; 556/453
[58] Field of Search ............... 556/462, 467, 469, 453; 528/21, 23, 22, 12, 14, 37

[56] References Cited

U.S. PATENT DOCUMENTS

| | | | |
|---|---|---|---|
| 2,830,967 | 4/1958 | Nitzsche et al. | 260/465 |
| 3,186,967 | 6/1965 | Nitzsche et al. | 260/465 |
| 3,706,775 | 12/1972 | Nitzsche et al. | 260/448.2 E |
| 3,839,388 | 10/1974 | Nitzsche et al. | 260/448.2 E |
| 3,853,933 | 12/1974 | Siciliano | 260/448.2 E |
| 4,725,643 | 2/1988 | Burkhardt | 524/789 |
| 4,792,596 | 12/1988 | Ottlinger et al. | 528/14 |
| 4,831,174 | 5/1989 | Elms | 556/451 |
| 4,835,237 | 5/1989 | Burkhardt et al. | 528/21 |
| 4,888,405 | 12/1989 | Gamon et al. | 528/23 |
| 4,975,510 | 12/1990 | Wegenhaupt et al. | 528/21 |

FOREIGN PATENT DOCUMENTS

| | | |
|---|---|---|
| 0324186 | 7/1989 | European Pat. Off. |
| 1488369 | 10/1977 | United Kingdom |
| 1488370 | 10/1977 | United Kingdom |

*Primary Examiner*—Melvyn I. Marquis
*Assistant Examiner*—Margaret W. Glass

[57] ABSTRACT

Linear triorganosiloxy-terminated polydiorganosiloxanes having a silanol content of less than about 200 ppm are prepared by condensing linear higher molecular weight polydiorganopolysiloxanediols having one Si-bonded hydroxyl group in each terminal unit and a silanol content of preferably greater than about 1000, in two separate stages, one using a fixed bed of a solid form of a conventional equilibration catalyst, and the other using a condensation/disproportionation catalyst, e.g., a phosphonitrilic halide or an oligomer thereof or a reaction product thereof with water, an alcohol, an acid, or a siloxane or silane, until the polydiorganosiloxane has reached the desired low content of silanol groups, e.g., below 200 ppm, by weight. The two stages can be carried out in either order, and a conventional monofunctional chain terminating agent can be present in either or both stages. The process preferably does not increase the cyclic byproduct content.

9 Claims, No Drawings

SYNTHESIS OF LOW SILANOL CONTENT, TRIORGANO-STOPPED SILICONE FLUIDS

The present invention relates to a process for preparing linear organopolysiloxanes and more particularly to a process for preparing linear organopolysiloxanes having terminal triorganosiloxy units and a low content of silicon-bonded hydroxyl groups.

BACKGROUND OF INVENTION

In the present state of the art, triorganosiloxy-stopped polydiorganosiloxane fluids are produced by the reaction of cyclic diorganosiloxanes, linear silanol-stopped polydiorganosiloxanes or mixtures of cyclic diorganosiloxanes and linear silanol-stopped polydiorganosiloxanes with some appropriate chainstopper such as a hexaorganodisiloxane in the presence of acidic or basic equilibration catalysts (where the term equilibration is used to describe the phenomenon which exists when the ratio of linear organosiloxane polymers to cyclic organosiloxane oligomers is brought to and maintained at a constant value), See, for example (a) "The Siloxane Bond" Eds.: Voronkov, M. G.; Mileshkevich, V. P,: Yuzhelevskii, Yu. A. Consultant Bureau, New York and London, 1978; and (b) Noll, "The Chemistry and Technology of Silicones", Academia Press, New York, (1968). Such reactions result in mixtures of (primarily) triorganosiloxy-stopped linear diorganosiloxanes and cyclic diorganosiloxanes. A typical example is the production of trimethylsiloxy-stopped dimethylsilicone fluids by the acid or base catalyzed equilibrations of mixtures of cyclic dimethyl siloxanes, silanol-stopped polydimethylsiloxanes and (preferably) hexamethyldisiloxane. Efficient silanol condensation and water removal is necessary in such reactions to produce low silanol products. Several patents, e.g., (a) Siciliano, George R,: U.S. Pat. No. 3,853,933, which describes the use of two fixed beds packed with acid treated carbon black under vacuum to equilibrate siloxanes; and (b) Ottinger, S., et al. U.S. Pat. No. 4,792,596. describe the use of fixed catalyst beds to effect siloxane polymerization. In a recent patent, Elms, R. A., U.S. Pat. No. 4,831,174, are described reaction mixtures high in silanol content which were rapidly equilibrated (30 minutes residence time or less) at 100° to 150° C. by passing inputs through 2 fixed beds of acid treated clay under pressures from 5 to 1520 torr. The resulting equilibrates were low in silanol content (from about 100 to 300 ppm Si—OH as listed in the examples). Finally, a series of Wacker Chemie patents, e.g., U.S. Pat. Nos. 2,830,967 (1958); 3,186,967 (1965); 3,706,775 (1972); 4,725,643 (1988); and 4,975,510 (1990) disclose the use of a variety of organonitrogen derivatives of phosphorus or phosphoric acid or linear phosphonitrilic chlorides for the efficient condensation of silanols.

Recently, it has been found that with certain catalysts, such as phosphonitrilic chlorides, that two linear siloxanes such as MD(x)M (where M is a trimethylsiloxy group; D is a dimethylsiloxy group and MD(x)M is a trimethylsiloxy-terminated polydimethylsiloxane of x units) and MD(y)M may be disproportionated to form a new MD(z)M, wherein z lies between x and y. It has further been discovered that cyclics/linears equilibration is inefficient under the reaction conditions; i.e., cyclic siloxanes are slow to react and cyclic siloxane formation from linears is also slow.

It would be advantageous for a process if cyclic siloxanes could be used in combination with linear (primarily silanol-stopped) polysiloxanes and a source of triorganosiloxy chainstopper (in the case of polydimethylsiloxane fluids, preferably hexamethyldisiloxane, MM) reacting to rapidly yield a mixture of triorganosiloxy-stopped polydialkylsiloxanes with, preferably, no more than 16 weight percent cyclic siloxanes. It would be especially preferred that the linear species resulting from these processes have low branching (trifunctional)- and low silanol contents, as well. The resulting mixtures would subsequently be stripped to produce fluids having viscosities primarily in the range from about 10 to 1000 cps. Volatile siloxanes vaporized off during any process step could be collected and recycled as starting material for future fluid syntheses.

Such objectives are achieved by the two step process of the present invention which combines the silanol condensation and siloxane disproportionation capabilities of catalysts like linear phosphonitrilic chlorides (LPNC's) with the cyclics/linears equilibration capabilities of fixed beds of catalysts such as acid-treated clays, and the like. The processes can be carried out in a variety of ways, as will be exemplified. For example, in one embodiment, a siloxane reaction mixture containing an appropriate chainstopper is sent through a fixed bed of catalyst, then the output treated with linear phosphonitrilic chloride to complete silanol condensation and siloxane disproportionation. Alternatively, the steps can be reversed, and the chainstopper can be added in either or both steps.

The process to be described hereinafter has, after numerous trials, been found to be operational with cycle times of as little as 25 minutes for lower viscosity fluids when a vacuum less than 10 torr is used. For higher viscosity fluids and pressures greater than 10 torr reactions are only somewhat longer (approx 40 to 45 min). Operating temperatures are as low as 90° C. The resulting mixtures have as little as 200 ppm or less Si—OH content, by weight, most often less than 100 ppm.

Thus a process has now been found which rapidly and efficiently reduces the silanol content of the starting diorganopolysiloxane diols, and provides triorganosiloxy end groups, while utilizing cyclics via equilibration.

SUMMARY OF THE INVENTION

In accordance with the present invention there is provided a process for the rapid formation of low silanol equilibrates from high silanol content reaction mixtures at operating temperatures from 80° to 150° C. The process consists of two stages. In one of the stages, a diorganodihalosilane hydrolyzate or a mixture of diorganodihalosilane hydrolyzate and an appropriate chainstopper, e.g., a short chain triorganosiloxy terminated polydiorganosiloxane, is passed into a reaction zone comprising a fixed bed of an equilibration catalyst, e.g., an acid treated clay, an ion exchange resin, or an acid treated carbon black, or a mixture of any of the foregoing, for a short residence time, e.g., as low as 10 min at 110° C. The primary purposes of the fixed bed stage are to achieve an equilibrium of cyclics and linears and, optionally, if a chain-terminating agent is present, to incorporate triorganosiloxy end groups into the polymer chain. In the other stage, a catalytic amount of a condensation/disproportionation catalyst, e.g., LPNC, etc., with or without chainstopper is used to effect silanol condensation and siloxane disproportionation. This treatment is preferably under vacuum to facilitate removal of water and reduction of the silanol content to a very low level. At 90° C. this stage is essentially complete within a few minutes. Regardless of the sequence of stages, the process of the invention results in a low silanol fluid equilibrate in which the preferred LPNC catalyst can be subsequently deactivated by conventional means such as by neutralization, but preferably by heating to 200° C. and stripping the volatiles to produce the final product with very low content of silanol.

Specifically, the invention contemplates, in its broadest aspects, a process for preparing linear triorganosiloxy-terminated organopolysiloxane fluids having less than a 200 ppm content of residual Si-bonded hydroxyl groups, the process consisting essentially of
(1) feeding a mixture of linear polydiorganosiloxanediols and cyclic polysiloxanes, the mixture having a cyclics content of preferably greater than about 14–16% by weight and a silanol content of preferably greater than about 1000 ppm by weight to a reaction zone comprising
(a) a fixed bed of equilibration catalyst;
(a') a fixed bed of equilibration catalyst in the presence of a chainstopper comprising a short chain triorganosiloxy-stopped polydiorganosiloxane; or
(a") a condensation/disproportionation catalyst and a chainstopper comprising a short chain triorganosiloxy-stopped polydiorganosiloxane; until a first stage product is obtained and
(2) thereafter
(b) feeding the first stage product of step (a) to a reaction zone comprising a condensation/disproportionation catalyst and a chain stopper comprising a short chain triorganosiloxy-stopped polydiorganosiloxane;
(b') feeding the first stage product of step (a') to a reaction zone comprising a condensation/disproportionation catalyst; or
(b") feeding the first stage product of step (a") to a reaction zone comprising a fixed bed of equilibration catalyst, to thereby produce a mixture of triorganosiloxy-terminated linear polydiorganosiloxanes and cyclic polydiorganosiloxanes, the mixture having a cyclics content preferably no greater than about 14–16% by weight and a low silanol content of less than about 200 ppm by weight.

Among its preferred embodiments, the present invention contemplates
(i) a process as defined above, consisting essentially of
(1) feeding a mixture of linear polydiorganosiloxanediols and cyclic polydiorganosiloxanes, the mixture having a cyclics content of preferably greater than about 14–16% by weight and a silanol content of preferably greater than about 1000 ppm by weight to a reaction zone comprising
(a) a fixed bed of equilibration catalyst; until a first stage product is obtained and
(2) thereafter
(b) feeding the first stage product of step (a) to a reaction zone comprising a condensation/disproportionation catalyst in the presence of a chain stopper comprising a short chain triorganosiloxy-stopped polydiorganosiloxane; to thereby produce a mixture of triorganosiloxy-terminated linear polydiorganosiloxanes and cyclic polysiloxanes, said mixture having a cyclics content preferably no greater than about 14–16% by weight and a low silanol content of less than about 200 ppm by weight;
(ii) a process as defined above, consisting essentially of (1) feeding a mixture of linear polydiorganosiloxandiols and cyclic polydiorganosiloxanes, the mixture having a cyclics content of preferably greater than about 14–16% by weight and a silanol content of preferably greater than about 1000 ppm by weight to a reaction zone comprising
(a') a fixed bed of equilibration catalyst in the presence of a chainstopper comprising a short chain triorganosiloxy-stopped polydiorganosiloxane; until a first stage product is obtained and
(2) thereafter
(b') feeding the first stage product of step (a') to a reaction zone comprising a condensation/disproportionation catalyst; to thereby produce a mixture of triorganosiloxy-terminated linear polydiorganosiloxanes and cyclic polydiorganosiloxanes, the mixture having a cyclics content preferably no greater than about 14–16% by weight and a low silanol content of preferably less than about 200 ppm by weight;
(iii) a process as defined above, consisting essentially of (1) feeding a mixture of linear polydiorganosiloxandiols and cyclic polydiorganosiloxanes, the mixture having a cyclics content of preferably greater than about 14–16% by weight and a silanol content of preferably greater than about 1000 ppm by weight to a reaction zone comprising
(a") a condensation/disproportionation catalyst and a chainstopper comprising a short chain triorganosiloxy-stopped polydiorganosiloxane; until a first stage product is obtained and
(2) thereafter
(b") feeding the first stage product of step (a") to a reaction zone comprising a fixed bed of equilibration catalyst, to thereby produce a mixture of triorganosiloxy-terminated linear polydiorganosiloxanes and cyclic polydiorganosiloxanes, the mixture having a cyclics content preferably no greater than about 14–16% by weight and a low silanol content of preferably less than about 200 ppm by weight; and
(iv) a process as first defined above, wherein the equilibration catalyst comprises an acidic or basic equilibration catalyst selected from an acid treated clay, an ion exchange resin, or a mixture thereof; one wherein the condensation/disproportionation catalyst comprises a catalyst selected from a phosphonitrilic halide, a linear oligomeric phosphonitrilic halide, a reaction product thereof with water, an alcohol, a carboxylic acid or a reactive derivative thereof, a phosphonitrilic halide-reactive organopolysiloxane, a phosphonitrilic halide-reactive organosilane or a mixture of any of the foregoing; one wherein the halide in the catalyst independently comprises chloride or bromide; one in which the chainstopper is hexamethyldisiloxane; and one wherein the silanol-end capped polysiloxanes comprise a diorganosilane hydrolyzate containing linear and cyclic species, the chainstopper comprises hexamethyldisiloxane, the catalyst for condensation comprises an acid-treated clay and the second stage condensation is carried out at 90° C. in the presence of an oligomeric LPNC catalyst so as to produce a low molecular weight trimethylsiloxy terminated oil with preferably no increase in cyclic content and a silanol content of less than about 200 ppm.

DESCRIPTION OF THE INVENTION

Any linear organopolysiloxane having one Si-bonded hydroxyl group in each terminal unit, which has been or could have been used heretofore in the presence of phosphonitrilic chloride as a catalyst to increase the viscosity of the organopolysiloxane by the condensation reaction may be used in the process of the present invention. Examples of preferred organopolysiloxanes are those having the formula $$HO(SiR_2O)_mH,$$

where R represents the same or different monovalent hydrocarbon group or halogenated monovalent hydrocarbon group, or hydrogen, with the proviso that one hydrocarbon group is bonded to each silicon to which hydrogen is directly bonded and m is an integer having a value of at least 2.

Although this is generally not shown in the formula, units having the formula $SiR_2O$ may be replaced by other siloxane units, such as siloxane units having the formulas $RSiO_{3/2}$ and $R_3SiO_{1/8}$, where R is the same as above, or $SiO_{4/2}$ or mixtures of at least two such units. The siloxane units other than the $SiR_2O$ units are generally present as impurities.

The R groups shown in the above formula preferably contain from 1 to about 18 carbon atoms per group. Examples of hydrocarbon groups represented by R are alkyl groups such as methyl, ethyl, n-propyl, isopropyl, n-butyl and sec-butyl as well as octadecyl; aliphatic groups having carbon-carbon double bonds such as vinyl and allyl; aryl groups such as phenyl and naphthyl; alkaryl groups such as tolyl; and aralkyl groups such as benzyl.

Examples of halogenated hydrocarbon groups represented by R are haloalkyl groups, such as 3,3,3-trifluoropropyl, and haloaryl groups such as the o-, p- and m-chlorophenyls.

The process of this invention preferably employs diorganopolysiloxanes having one Si-bonded hydroxyl group in each terminal group and all the organic groups are methyl radicals.

The organopolysiloxane starting material may have inherently the desired viscosity or it may achieve the desired viscosity in the presence of the LPNC catalyst, in accordance with the prior art.

The phosphazene PNC catalysts which may be used in preferred embodiments include phosphonitrilic chlorides, such as those obtained by reacting 400 weight parts of phosphorus pentachloride with 130 parts of ammonium chloride, such as described in Berichte der Duetschen Chemischen Gesellschaft, volume 57 (1924), page 1345, or those obtained by reacting 2 moles of phosphorus pentachloride with 1 mole of ammonium chloride, such as described in U.S. Pat. No. 3,839,388 to Nitzsche et al., as well as oligomeric linear phosphazenes made by procedures to be exemplified hereinafter. Of course, mixtures of at least two types of phosphonitrilic halides, e.g., chlorides, may also be used. Also, derivatives are contemplated, such as the above-mentioned reaction products with water, alcohols, acids, functionally-reactive organosiloxanes, -organosilanes, mixtures of any of them, and the like, can be used.

The phosphazene catalyst, e.g., phosphonitrilic chloride, is preferably used in an amount of from about 1 to 40 ppm by weight and more preferably from about 5 to 20 ppm by weight, based on the weight of the starting linear organopolysiloxane having one Si-bonded hydroxyl group in each terminal unit.

The condensations of the linear organopolysiloxanes having one Si-bonded hydroxyl group in each terminal unit is preferably conducted in both stages at a temperature of from about 90° to about 140° C.

In order to facilitate the removal of water formed in the condensation reaction, it is preferred that the reactions of the linear organopolysiloxane having one Si-bonded hydroxyl group in each terminal unit with the chain stopper be conducted at pressures below about 700 torr; however, the reaction may also be conducted at higher pressures, if desired.

The time interval between addition of phosphonitrilic chloride to the mixture of the linear polydiorganosiloxane having one Si-bonded hydroxyl group in each terminal unit, the cyclic polydiorganosiloxanes and, optionally, the short chain triorganosiloxy-stopped polydiorganosiloxane chainstopper is not critical.

Hexaorganodisiloxanes used in the process of this invention preferably have the formula:

$$(R_3{}^1Si)_2O,$$

where $R^1$ is the same or different monovalent hydrocarbon group or a halogenated monovalent hydrocarbon group. Preferably, the $R^1$ groups contain from 1 to 18 carbon atoms per group. Specific examples of organic groups represented by R above are also applicable for the $R^1$ groups.

If the chainstopper is hexamethyldisiloxane, it is used in an amount of from about 0.5% to 10% preferably in the amount of about 0.6% to 7% by weight.

The process of the present invention may be conducted batch-wise or semi-continuously, or as a continuous process; however, it is preferably conducted as a semi-continuous or continuous process.

In one manner of proceeding, a mixture of linear polydiorganopolysiloxanediols, preferably greater than about 14% cyclic polydiorgansiloxanes and chainstopper (preferably a hexaorganodisiloxane) is passed through a fixed bed of a catalyst such as acid treated clay granules (Filtrol ® 24, Engelhard), preferably at 110° C. with a 10 minute residence time. The resulting mixture of M— and Si—OH-stopped linear siloxanes and about 14–16% or less cyclics, is treated with a condensation/disproportionation catalyst such as phosphonitrilic chloride under vacuum to complete silanol condensation/siloxane disproportionation. At 90° C. and 3 torr the condensation is usually complete within 5 minutes (the length of reaction time at a given temperature is dependent on the vacuum). The resulting mixture consists linear triorganosiloxy-stopped polydiorganosiloxanes, preferably less than 16% cyclic polydiorganosiloxanes and soluble catalyst which may be deactivated and/or removed before devolatilization.

In the following processes the purpose of the fixed bed is primarily to convert cyclic siloxanes into linears (although some silanol condensation does occur in the fixed bed with the next-mentioned process).

In a second manner of proceeding, a mixture consisting of linear polydiorganosiloxanediols and preferably greater than 14–16% cyclic polydiorganosiloxanes is passed through a fixed bed of a catalyst such as acid-activated clay granules. The resulting higher viscosity mixture, consisting of higher molecular weight linear polysiloxanediols (silanol condensation and equilibration occurs) and about 14% by weight cyclic siloxanes, may be treated with a condensation/disproportionation catalyst such as linear phosphonitrilic chloride, an appropriate chainstopper and vacuum. If hexamethydisiloxane is utilized as the chainstopper, it is preferred that either condensation under vacuum is followed by addition of MM at atmospheric pressure (for condensations in the absence of MM it may be necessary for mechanical purposes to add a small amount of $MD_{(x)}M$ chainstopper during condensation to limit the viscosity of the condensed mixture) or MM is incorporated into the polymer at atmospheric pressure followed by condensation under vacuum. The resulting mixture consists of M-stopped linear siloxanes, less than about 16% cyclic siloxanes and residual catalyst which may be deactivated and/or removed before devolatilization.

In a third manner of proceeding, condensation/disproportionation with a LPNCcatalyst or the like is followed by equilibration in a fixed bed. A mixture of linear polydiorganosiloxanediols and preferably greater than about 14% cyclic polydiorganosiloxanes is treated with a condensation/disproportionation catalyst such linear phosphonitrilic chlorides, an M chainstopper and vacuum. If the chainstopper is hexamethyldisiloxane, it is preferred that the mixture is treated with catalyst and vacuum to complete condensation, followed by addition of MM and disproportionation at atmospheric pressure. The resulting mixture, consisting of linear triorganosiloxy-stopped polydiorganosiloxanes and preferably greater than about 14% cyclics and soluble catalyst is passed through a fixed bed of catalyst such as acid treated clay granules. The resulting mixture consists of linear triorganosiloxy-stopped polydiorganosiloxanes and about 14% cyclic polydiorganosiloxanes.

The linear triorganosiloxy-terminated organopolysiloxanes prepared in accordance with the present invention are applicable for all purposes known heretofore for low silanol content linear triorganosiloxy-terminated organopolysiloxanes produced by previous methods. These linear triorganosiloxy-terminated organopolysiloxanes may be used, for example, as lubricants, in the formation of organopolysiloxane coatings which are crosslinked by radical-forming agents, or by the addition of SiC-bonded vinyl groups to Si-bonded hydrogen, and in the formation of nonstick coatings.

DESCRIPTION OF THE PREFERRED EMBODIMENTS

The following examples illustrate the present invention but the claims are not intended to be limited thereto. Unless otherwise specified, all parts are by weight. All viscosities were measured at 25° C. with Ostwald tubes. Molecular weight data were obtained with Gel Permeation Chromatography (refractive index detection; calibrated with polystyrene standards). The syntheses of the phosphonitrilic chloride catalysts used in some of these examples has been described in the literature mentioned in connection therewith.

EXAMPLE 1

Two Step Reaction: Chlorosilane Hydrolyzate Condensation in the Presence of Hexamethyldisiloxane in Fixed Bed of Acid Treated Granular Clay Catalyst Followed by Condensation/Disproportionation with Linear, Oligomeric LPNC Catalyst (a) Preparation of Linear Phosphonitrilic Chloride Catalyst A 100 ml flask was charged with 20.5 g of phosphorus pentachloride, 2.7 g of ammonium chloride and 50 g of tetrachloroethane. The mixture was stirred and refluxed for 8 hours. After the reaction was over, the reaction mixture was poured into petroleum ether. The precipitate was dissolved in methylene chloride and reprecipitated with petroleum ether. After removing traces of solvent under vacuum, 14 g of light yellow crystals of the title product (LPNC) were obtained.

(b) Stage 1 Equilibration, Condensation and Chain-termination

A mixture of 64% by wt of linear polydimethylsiloxanediols, about 34.4% cyclic polydimethylsiloxanes and 1.6% hexamethyldisiloxane (reaction mixture silanol content approximately 9000 ppm) was passed through a stainless steel pressure vessel packed with acid treated clay (Filtrol®-24, Engelhard) which was heated to 110° C. The siloxane feed residence time in this fixed bed was approximately 10 minutes.

(c) Stage 2 Condensation and Disproportionation

The output from the reactor (80 cps viscosity, 13.8% volatile content) was charged into a roundbottom flask and treated with 15 ppm of the catalyst of Example 1 (a) (2.3 wt % solution in methylene chloride) at 90° C. and 7 torr. After 3 minutes the trimethylsiloxy-terminated polydimethylsiloxane/cyclic dimethylsiloxane equilibrate viscosity was 218 cps with 12% volatiles and 80 ppm silanol content.

The data presented in Example 1 indicates that the product produced is noteworthy because the silanol contents are markedly reduced, from 9000 ppm to only 80 ppm and there is no significant formation of cyclic byproducts. These are indications that the LPNC catalyst does not promote efficient equilibration under these conditions.

Repetition of the process under the same conditions resulted in a mixture viscosity of 280 cps with a 10% volatiles content.

EXAMPLE 2

If the process of Example 1 is repeated with a phosphonitrile chloride catalyst prepared according to U.S. Pat. No. 3,839,388 to Nitzsche et al, by reacting 2 mols of phosphorus pentachloride with one mol of ammonium chloride until the evolution of hydrogen chloride ceases, substantially the same results will be obtained.

EXAMPLE 3

Two Step Reaction: Chlorosilane Hydrolyzate Condensation and Equilibration in Fixed Bed of Acid Treated Granular Clay Catalyst Followed by Condensation/Disproportionation with Linear, Oligomeric LPNC Catalyst in the Presence of Hexamethyldisiloxane A polydimethylsiloxanediol/cyclic polydimethylsiloxane mixture (approx 35 wt % cyclics; 30 cps; 8000 ppm SiOH) was passed through a packed bed of acid-treated clay granules (Filtrol®-24 at 120° C. with a residence time of about 10 minutes. The resulting mixture (818 cps, approx 14% volatiles) was placed in a flask and treated with hexamethyldisiloxane (1.6% by wt) and 30 ppm of the catalyst of Example 1 (a) (3.0 wt % in methylene chloride) at 90° C. After 30 minutes, the flask and contents were placed under vacuum (50 torr) for 7 minutes. The mixture (181 cps) was placed under vacuum for an additional 10 minutes without significant increase in viscosity indicating the completion of condensation: 186 cps; 10.6% volatiles; less than 100 ppm Si—OH.

EXAMPLE 4

Two Step Reaction: Chlorosilane Hydrolyzate Condensation/Disproportionation with Linear, Oligomeric LPNC Catalyst in the Presence of Hexamethyldisiloxane Followed by Condensation and Equilibration in Fixed Bed of Acid Treated Granular Clay Catalyst A polydimethylsiloxanediol/cyclic polydimethylsiloxane mixture (approx. 35 wt % cyclics; 30 cps, 8000 ppm SiOH) was charged into a round-bottom flask, heated to 90° C. then treated with 20 ppm of the catalyst of Example 1 (a) (2.3 wt % in methylene chloride) and placed under a 7 torr vacuum for 10 minutes. The resulting heavy oil was mixed with enough octamethylcyclotetrasiloxane (approx 10% by wt) to replace the volatile siloxanes lost under vacuum. The mixture was treated at 90° C. with hexamethyldisiloxane (4.5% by wt) and a second portion of the catalyst of Example 1 (a) (20 ppm). After 15 minutes the flask contents (27 cps, 35% volatiles) were passed through a fixed bed of acid-treated clay (Filtrol®-24) at 110° C. (10 minute residence time), resulting in a 39 cps mixture with 14.2% volatiles and approx. 200 ppm Si—OH.

EXAMPLE 5

If the process of Example 1 is repeated, substituting sodium- or potassium silanolate for the linear LPNC catalyst in step (d), substantially the same results will be obtained, except that the catalyst must be neutralized at the end of the reaction and the byproducts formed must be distilled therefrom with the volatile cyclics.

The above-mentioned patents, publications and Test Methods are incorporated herein by reference.

Many variations of the invention will suggest themselves to those skilled in this art in light of the above, detailed description. For example, instead of hexamethyldisiloxane and dodecamethyltetrasiloxane, divinyltetramethylsiloxane can be used as chain terminating agents. Instead of LPNC catalysts, their bromide analogues can be used. A minor proportion of the methyl groups bonded to silicon can be replaced with one or more of ethyl, phenyl, trifluoro, vinyl, and the like such groups. Instead of a halogenated solvent, the catalysts can be prepared in hydrocarbon media, such as toluene, and the like, using a dispersing agent if needed. All such obvious modifications are within the full intended scope of the appended claims.

We claim:

1. A process for preparing linear triorganosiloxy-terminated organopolysiloxane fluids having less than a 220 ppm content of residual Si-bonded hydroxyl groups, said process consisting essentially of
   (1) feeding a mixture of linear polydiorganosiloxanediols and cyclic polydiorganosiloxanes, said mixture having a cyclics content and a silanol content to a reaction zone comprising
      (a) a fixed bed of equilibration catalyst comprising an acidic or basic equilibration catalyst selected from an acid treated clay, an ion exchange resin, an acid treated carbon black, or a mixture of any of the foregoing;
      (a') a fixed bed of said equilibration catalyst in the presence of a chainstopper comprising a short-chain triorganosiloxy-stopped polydiorganopolysiloxane; or
      (a") a chainstopper comprising a short-chain triorganosiloxy-stopped polydiorganosiloxane and a condensation/disproportionation catalyst selected from a group consisting of a phosphonitrilic halide, a linear oligomeric phosphonitrilic halide, a reaction product thereof with water, an alcohol, a carboxylic acid or a reactive derivative thereof, a phosphonitrilic halide-reactive organopolysiloxane, a phosphonitrilic halide-reactive organosilane and a mixture of any of the foregoing for disproportionating and condensing said linear polydiorganosiloxanediols with said chainstopper; until a first stage product is obtained and
   (2) thereafter
      (b) feeding the first stage product of step (a) to a reaction zone comprising said condensation/disproportionation catalyst and said chain stopper;
      (b') feeding the first stage product of step (a') to a reaction zone comprising said condensation/disproportionation catalyst; or
      (b") feeding the first stage product of step (a") to a reaction zone comprising a fixed bed of said equilibration catalyst, to thereby produce a mixture of triorganosiloxy-terminated linear polydiorganosiloxanes and cyclic polydiorganosiloxanes, said mixture having a cyclics content no greater than about 14–16% by weight and a low silanol content of less than about 200 ppm by weight.

2. A process for preparing linear triorganosiloxy-terminated organopolysiloxane fluids having less than a 200 ppm content of residual Si-bonded hydroxyl groups, said process consisting essentially of
   (1) feeding a mixture of linear polydiorganosiloxanediols and cyclic polydiorganosiloxanes, said mixture having a cyclics content and a silanol content to a reaction zone comprising
      (a) a fixed bed of equilibration catalyst; until a first stage product is obtained and
   (2) thereafter
      (b) feeding the first stage product of step (a) to a reaction zone comprising a chainstopper comprising a short-chain triorganosiloxy-stopped polydiorgano-siloxane and a condensation/disproportionation catalyst for disproportionating and condensing said linear polydiorganosiloxanediols with said chainstopper; to thereby produce a mixture of triorganosiloxy-terminated linear polydiorganosiloxanes and cyclic polydiorganosiloxanes, said mixture having a cyclics content no greater than about 14–16% by weight and a low silanol content of less than about 200 ppm by weight.

3. A process for preparing linear triorganosiloxy-terminated organopolysiloxane fluids having less than a 200 ppm content of residual Si-bonded hydroxyl groups, said process consisting essentially of
   (1) feeding a mixture of linear polydiorganosiloxandiols and cyclic polydiorganosiloxanes, said mixture having a cyclics content and a silanol content to a reaction zone comprising
      (a') a fixed bed of equilibration catalyst and a chainstopper comprising a short-chain triorganosiloxy-stopped polydiorganosiloxane; until a first stage product is obtained and
   (2) thereafter (b') feeding the first stage product of step (a') to a reaction zone comprising a condensation/disproportionation catalyst for disproportionating and condensing said linear polydiorganosiloxanediols with said chainstopper; to thereby produce a mixture of triorganosiloxy-terminated linear polydiorganosiloxanes and cyclic polydiorganosiloxanes, said mixture having a cyclics content no greater than about 14–16% by weight and a low silanol content of less than about 200 ppm by weight.

4. A process for preparing linear triorganosiloxy-terminated polydiorganosiloxane fluids having less than a 200 ppm content of residual Si-bonded hydroxyl groups, said process consisting essentially of (1) feeding a mixture of linear polydiorganosiloxandiols and cyclic polydiorganosiloxanes, said mixture having a cyclics content and a silanol content to a reaction zone comprising (a″) a chain stopper comprising a short-chain triorganosiloxy-stopped polydiorganosiloxane and a condensation/disproportionation catalyst selected from a group consisting of a phosphonitrilic halide, a linear oligomeric phosphonitrilic halide, a reaction product thereof with water, an alcohol, a carboxylic acid or a reactive derivative thereof, a phosphonitrilic halide-reactive organopolysiloxane, a phosphonitrilic halide-reactive organosilane or a mixture of any of the foregoing for disproportionating and condensing said linear polydiorganosiloxanediols with said chain stopper; until a first stage product is obtained and (2) thereafter (b″) feeding the first stage product of step (a″) to a reaction zone comprising a fixed bed of equilibration catalyst comprising an acidic or basic equilibration catalyst selected from an acid treated clay, an ion exchange resin, an acid treated carbon black, or a mixture of any of the foregoing, to thereby produce a mixture of triorganosiloxy-terminated linear polydiorganosiloxanes and cyclic polydiorganosiloxanes, said mixture having a cyclics content no greater than about 14–16% by weight and a low silanol content of less than about 200 ppm by weight.

5. A process as defined in claim 1, wherein the halide in the condensation/disproportionation catalyst independently comprises chloride or bromide.

6. A process as defined in claim 1, wherein the chainstopper is hexamethyldisiloxane.

7. A process as defined in claim 1 wherein hexamethyldisiloxane is used as a chain stopper, the condensation/disproportionation catalyst comprises a linear oligomeric phosphonitrillic chloride compound and steps (2)(a) and (2)(b) are carried out at about 90° C.

8. The process of claim 1, wherein said cyclics content of said mixture is greater than about 14–16% by weight, said silanol content of said mixture is greater than about 1000 ppm by weight.

9. The process of any one of claims 2, 3, or 4, wherein said cyclics content of said mixture is greater than about 14–16% by weight, said silanol content of said mixture is greater than about 1000 ppm by weight.

* * * * *